United States Patent
Endo et al.

(10) Patent No.: US 6,683,726 B2
(45) Date of Patent: Jan. 27, 2004

(54) IMAGE DISPLAY APPARATUS

(75) Inventors: Takeshi Endo, Osaka (JP); Yasushi Kobayashi, Itami (JP); Yoshie Shimizu, Ibaraki (JP); Soh Ohzawa, Toyonaka (JP)

(73) Assignee: Minolta Co., Ltd., Osaka (JP)

( * ) Notice: Subject to any disclaimer, the term of this patent is extended or adjusted under 35 U.S.C. 154(b) by 130 days.

(21) Appl. No.: 09/952,529

(22) Filed: Sep. 14, 2001

(65) Prior Publication Data

US 2002/0030773 A1 Mar. 14, 2002

(30) Foreign Application Priority Data

Sep. 14, 2000 (JP) .......................................... 2000-279106

(51) Int. Cl.⁷ ............................................... G02B 27/14
(52) U.S. Cl. ........................ 359/629; 359/630; 359/732
(58) Field of Search ................................. 359/629–631, 359/726–727, 732–736, 833, 638, 649–651

(56) References Cited

U.S. PATENT DOCUMENTS

| 5,900,976 A | 5/1999 | Handschy et al. | 359/495 |
| 6,222,676 B1 * | 4/2001 | Togino et al. | 359/630 |
| 6,396,639 B1 * | 5/2002 | Togino et al. | 359/630 |
| 6,404,556 B1 * | 6/2002 | Kobayashi | 359/630 |

FOREIGN PATENT DOCUMENTS

JP 11-125791 A 5/1999

* cited by examiner

*Primary Examiner*—Jordan M. Schwartz
(74) *Attorney, Agent, or Firm*—Sidley Austin Brown & Wood LLP (57) ABSTRACT

An image display apparatus has a reflective display element for displaying a two-dimensional image on a display plane, a light source for emitting illuminating light for illuminating said display plane, a magnifier optical system for magnifying and projecting said two-dimensional image, and an optical member which is composed of a medium having a refractive index greater than or equal to unity and has at least three optical planes of a first plane, a second plane, and a third plane. The magnifier optical system is substantially in concentricity with said display plane; the illuminating light from said light source passes through said first plane and then through said second plane, thereby illuminating said display plane; and the reflected light from said display plane passes through said second plane and is then reflected in said first plane, thereby passing through said third plane and being incident on said magnifier optical system.

12 Claims, 5 Drawing Sheets

IMAGE DISPLAY APPARATUS

RELATED APPLICATION

This application is based on Application No. 2000-279106 filed in Japan, the contents of which is hereby incorporated by reference.

FIELD OF THE INVENTION

The present invention relates to an image display apparatus, and in particular, to an image display apparatus such as a projector and an HMD (head mounted display) in which a two-dimensional image rendered on an illuminated LCD (liquid crystal display) is projected and displayed onto a screen or viewer's eyes.

DESCRIPTION OF THE PRIOR ART

In an ordinary image display apparatus for displaying a two-dimensional image rendered on a reflective LCD, the LCD display plane is illuminated by illuminating light composed of specific polarized light (for example, p-polarized light), whereby specific polarized light (for example, s-polarized light) in the reflected light is extracted as image light. The image light is then introduced onto a screen or a viewers s eye by a magnifier optical system, whereby the two-dimensional image is magnified and projected. Japanese Laid-Open Patent Publication No. 11-125791 proposes an image display apparatus for magnifying and projecting a two-dimensional image by using a magnifier optical system arranged in a decentered manner with respect to the display plane of a reflective LCD. The magnifier optical system is composed of an eccentric prism for correcting the deformation (trapezoidal distortion and the like) caused by the decentered optical configuration. However, the eccentric prism needs complicated design and fabrication processes, thereby causing an increase in the cost of the apparatus.

This complication in the magnifier optical system is avoided by arranging the magnifier optical system concentrically with respect to the display plane of the reflective LCD. However, this causes the necessity of optical path separation between the illuminating light onto the LCD and the reflected light from the LCD. In a first prior art example shown in FIG. 9, the optical path separation between the illuminating light and the reflected light is carried out by a reflective polarizer film (4A). An image display apparatus having such configuration is proposed in U.S. Pat. No. 5,900,976 and the like. Illuminating light emitted from an LED (light emitting diode; 1) is diffused when passing through a diffuser plate (2), and then passes through a condenser lens (3). After that, p-polarized light alone passes through the reflective polarizer film (4A), thereby illuminating a display plane (5a) of an LCD (5). The LCD (5) controls the polarization of light selectively depending on the display at each pixel of a two-dimensional image (that is, the ON/OFF state of each pixel), thereby emitting the reflected light composed of two kinds of polarization (p-polarized light and s-polarized light). In the reflected light, s-polarized light alone is reflected by the reflective polarizer film (4A), thereby serving as image image light. The light is then introduced onto a screen or a viewer s eye by a magnifier optical system (6; AX indicates optical axis).

Figure 10:
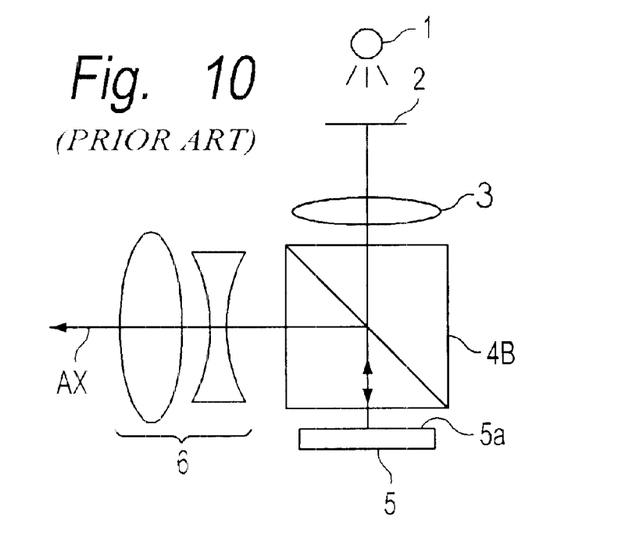
FIG. 10 is an optical configuration diagram showing a schematic configuration of a second prior art example.

In a second prior art example shown in FIG. 10, the optical path separation between illuminating light and reflected light is carried out by a prism-type PBS (4B; polarizing beam splitter). Illuminating light emitted from an LED (1) is diffused when passing through a diffuser plate (2), and then passes through a condenser lens (3). After that, p-polarized light alone passes through the PBS (4B), thereby illuminating a display plane (5a) of an LCD (5). The LCD (5) controls the polarization of light selectively depending on the display at each pixel of a two-dimensional image (that is, the ON/OFF state of each pixel), thereby emitting the reflected light composed of two kinds of polarization (p-polarized light and s-polarized light). In the reflected light, s-polarized light alone is reflected by the PBS (4B), thereby serving as image light. The light is then introduced onto a screen or a viewer's eye by a magnifier optical system (6; AX indicates optical axis).

Figure 9:
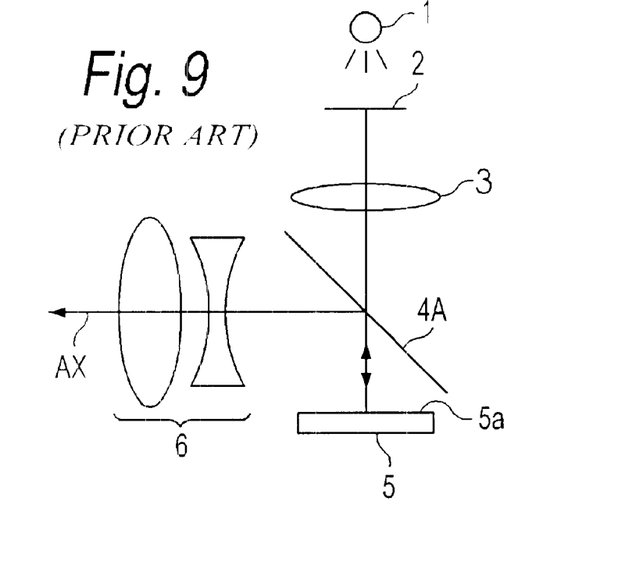
FIG. 9 is an optical configuration diagram showing a schematic configuration of a first prior art example.

In the first prior art example, an air region is present in the optical path between the LCD (5) and the magnifier optical system (6). Accordingly, for the purpose that a sufficient back focal length of the magnifier optical system (6) is prepared for arranging the illumination system comprising the condenser lens (3) and the like, the focal length of the magnifier optical system (6) needs to be longer. This causes a difficulty in obtaining a wider angle of view or a wider angle of field. On the other hand, in the second prior art example, the larger and heavier PBS (4B) composed of two prisms prevents size and weight reduction of the apparatus. An object of the present invention is to provide an image display apparatus for permitting the viewing of an image, wherein a magnifier optical system is substantially in concentricity with a display plane, wherein illuminating light from a light source passes through a first plane and then through a second plane, thereby illuminating the display plane, and wherein reflected light from the display plane passes through the second plane and is then reflected by the first plane, thereby passing through a third plane and then being incident on the magnifier optical system.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENT

An image display apparatus in accordance with the present invention is described below with reference to the

Figure 1:
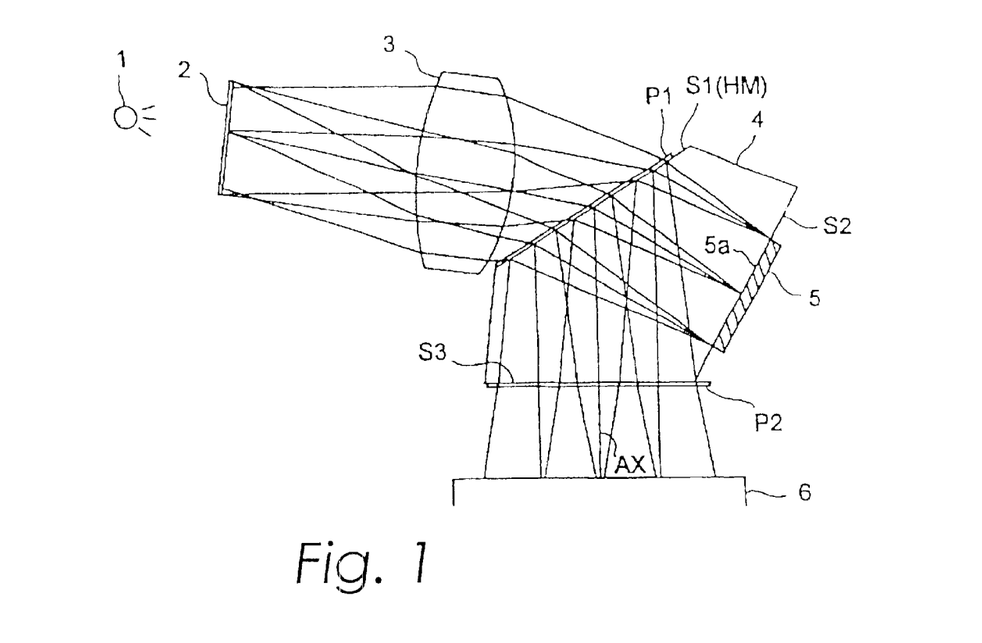
FIG. 1 is an optical configuration diagram showing a schematic configuration of Embodiment 1.

Embodiment 1 (FIG. 1)

FIG. 1 shows the optical configuration of Embodiment 1. An image display apparatus comprises an LED (1), a diffuser plate (2), a condenser lens (3), a prism (4), a reflective LCD (5), a magnifier optical system (6), and a first and a second polarizer plate (P1, P2). The LED (1) is a light source for emitting the illuminating light for illuminating a display plane (5a) of the LCD (5). The LCD (5) is a reflective liquid crystal display for displaying a two-dimensional image onto the display plane (5a). Since the LCD (5) is a non-light-emitting display, the two-dimensional image is visualized by the illuminating light from LED (1) for illuminating the display plane (5a), and is then magnified and projected by the magnifier optical system (6). The magnifier optical system (6) corresponds to a projection optical system of a projector or an ocular optical system of an HMD.

The prism (4) is a single optical member which is composed of a medium having a refractive index greater than or equal to unity and has the optical planes of a first plane (S1), a second plane (S2), and a third plane (S3). The presence of the prism (4) in the optical path between the LCD (5) and the magnifier optical system (6) causes a longer back focal length by an amount yielded by the refraction in the prism (4). The longer back focal length eases arranging of an illumination system (condenser lens (3) and the like). This permits a shorter focal length of the magnifier optical system (6), and further permits a wider angle of view and a wider angle of field.

The first plane (S1) of the prism (4) is a half-mirror plane (HM), or a partially transmitting plane, which partially transmits and reflects the light regardless of the polarization. The optical path separation between the illuminating light onto the display plane (5a) and the reflected light from the display plane (5a) is carried out by the half-mirror plane (HM). The optical path separation by a single optical member permits size and weight reduction, and hence cost reduction. Here, the first polarizer plate (P1) is adhered on the first plane (S1), while the second polarizer plate (P2) is adhered on the third plane (S3). The polarizer plates (P1, P2) are arranged such that the polarization axes (transmission axes) are orthogonal with each other (the situation is the same also in the other embodiments).

The second plane (S2) and the display plane (5a) are in close contact with each other (without an air layer), and accordingly the space between the liquid crystal layer (not shown) of the LCD (5) and the second plane (S2) is filled with a medium having a refractive index greater than or equal to unity (the situation is the same also in Embodiments 2–4, 7). The medium corresponds, for example, to a protection glass layer of the LCD (5). Accordingly, the surface reflection in the protection glass layer is prevented without an anti-reflection film, thereby improving the image quality. Further, there is the merit of easy arrangement of the LCD (5).

Illuminating light emitted from the LED (1) is diffused when passing through the diffuser plate (2), and is then incident on the condenser lens (3). An EL element (electro-luminescence element) may be used in place of both the LED (1) and the diffuser plate (2) (the situation is the same also in the other embodiments). The use of EL elements permits a compact configuration suitable for an HMD and the like. The condenser lens (3) is provided between the LED (1) or the like and the prism (4), and makes the illuminating light substantially parallel. The illuminating light having passed through the condenser lens (3) is incident on the first polarizer plate (P1). Specific polarized light (for example, p-polarized light) alone of the illuminating light passes through the first polarizer plate (P1). The illuminating light having passed through the first polarizer plate (P1) is incident on the first plane (S1) of the prism (4). Since the first plane (S1) is a half-mirror plane (HM), only a part of the illuminating light passes through the first plane (S1). The illuminating light having passed through the first-plane (S1) passes through the second plane (S2), thereby illuminating the display plane (5a) of the LCD (5) substantially from the perpendicular direction.

The LCD (5) controls the polarization of light selectively depending on the display at each pixel of a two-dimensional image (that is, the ON/OFF state of each pixel), thereby emitting the reflected light composed of two kinds of polarization (p-polarized light and s-polarized light) from the display plane (5a). The reflected light from the display plane (5a) passes through the second plane (S2), and is then reflected in the first plane (Si). Since the first plane (S1) is a half-mirror plane (HM), only a part of the reflected light from the display plane (5a) is reflected in the first plane (S1). The reflected light from the first plane (S1) passes through the third plane (S3) and exits from the prism (4), thereby being incident on the second polarizer plate (P2). In the reflected light, specific polarized light (for example, s-polarized light) alone passes through the second polarizer plate (P2), thereby serving as image light. The light is incident on the magnifier optical system (6; AX indicates optical axis) and then introduced onto a screen or a viewer's eye. The present configuration that the magnifier optical system (6) is substantially in concentricity with the display plane (5a) of the LCD (5) avoids the complexity necessary for correcting deformation (trapezoidal distortion and the like) (the situation is the same also in the other embodiments).

The present image display apparatus uses a reflective LCD (5) of a type in which a two-dimensional image is displayed using two polarizer plates (P1, P2) in combination. However, a reflective LCD of polarizer-plate-unnecessary type may be used instead. Reflective LCD's of polarizer-plate-unnecessary type include a cholesteric-nematic transition type LCD and a polymer dispersion type LCD. The cholesteric-nematic transition type LCD uses a guest-host liquid crystal prepared by adding a dichroic dye to a cholesteric-nematic transition liquid crystal, and uses light absorption/transmission depending on the orientation change of the dye. In the polymer dispersion type LCD, the refractive index of a liquid crystal dispersed in a polymer is changed by a voltage applied, whereby the light scattering caused by the refractive index difference between the liquid crystal and the polymer is used for displaying.

Figure 2:
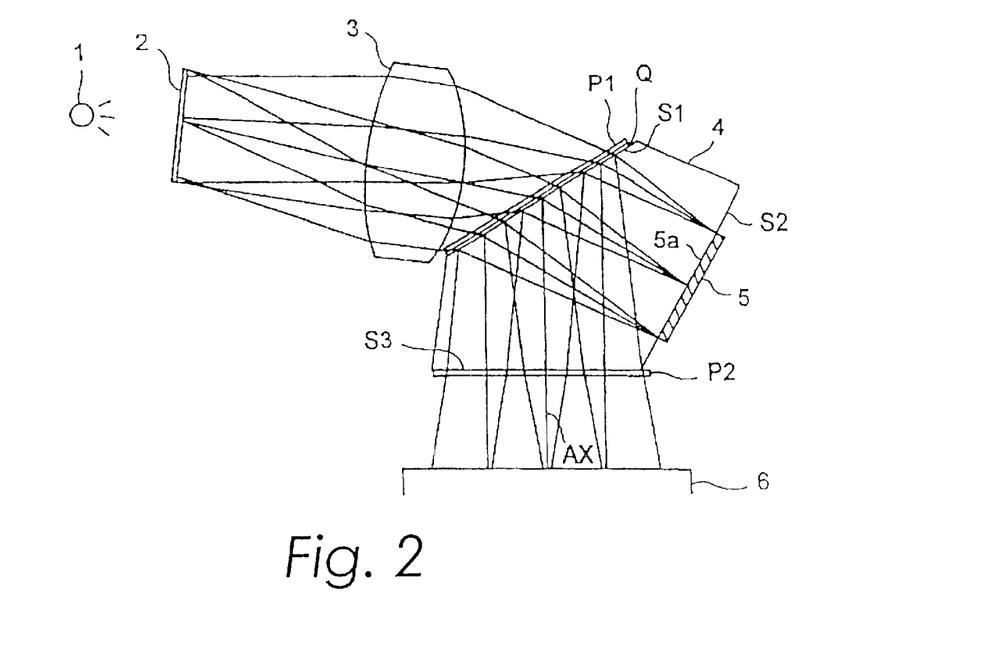
FIG. 2 is an optical configuration diagram showing a schematic configuration of Embodiment 2.

Embodiment 2 (FIG. 2)

FIG. 2 shows the optical configuration of Embodiment 2. An image display apparatus according to the present embodiment is characterized in that the first plane (S1) is a polarization-selective reflection plane composed of a reflective polarizer film (Q) and that the film is used in place of the half-mirror plane (HM) of FIG. 1. The other points are the same as the configuration of Embodiment 1. The reflective polarizer film (Q) is a film fabricated by the process of expanding a film composed of a plurality of layers thereby imparting the property of double refraction (for example, DBEF (trade name) available from 3M, Inc.). By virtue of the double refraction, incident light is separated into reflected light and transmitted light having a different polarization from each other. Accordingly, the optical path separation between the illuminating light onto the display plane (5a) and the reflected light from the display plane (5a) is carried out by the reflective polarizer film (Q) which is adhered onto the first plane (S1) of the prism (4) and serves as the polarization-selective reflection plane. This configuration improves both the usage efficiency of the illuminating light and the contrast in comparison with the case of a half-mirror plane (HM). Here, the polarization-selective reflection plane may be composed of a multi-layer film (for example, a multi-layer dielectric coating film) (the situation is the same also in Embodiments 4–6, 8).

Illuminating light emitted from the LED (1) is diffused when passing through the diffuser plate (2), and then passes through the condenser lens (3). The illuminating light having passed through the condenser lens (3) is incident on the first polarizer plate (P1). Specific polarized light (p-polarized light) alone of the illuminating light passes through the first polarizer plate (P1). The illuminating light having passed through the first polarizer plate (P1) is incident on the reflective polarizer film (Q). Since the illuminating light substantially has a specific polarity, the most part (p-polarized light) of the illuminating light passes through the reflective polarizer film (Q). The illuminating light having passed through the reflective polarizer film (Q) passes through the first plane (S1) and the second plane (S2) of the prism (4), thereby illuminating the display plane (5a) of the LCD (5) substantially from the perpendicular direction.

The LCD (5) controls the polarization of light selectively depending on the display at each pixel of a two-dimensional image (that is, the ON/OFF state of each pixel), thereby emitting the reflected light composed of two kinds of polarization (p-polarized light and s-polarized light) from the display plane (5a). The reflected light from the display plane (5a) passes through the second plane (S2), and is then reflected in the first plane (S1). Since the first plane (S1) is a polarization-selective reflection plane composed of the reflective polarizer film (Q), s-polarized light alone of the reflected light from the display plane (5a) is reflected in the first plane (S1). The reflected light (s-polarized light) from the first plane (S1) passes through the third plane (S3) and exits from the prism (4), thereby being incident on the second polarizer plate (P2). The light becomes image light (s-polarized light) free from ghost when passing through the second polarizer plate (P2). The light is incident on the magnifier optical system (6) and then introduced onto a screen or a viewer's eye.

Figure 3:
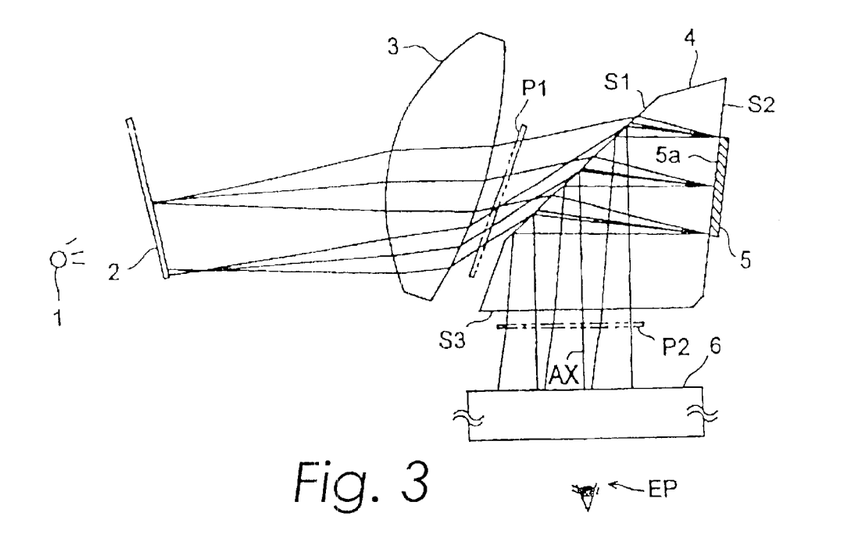
FIG. 3 is an optical configuration diagram showing a schematic configuration of Embodiment 3.

Embodiment 3 (FIG. 3)

FIG. 3 shows the optical configuration of Embodiment 3. An image display apparatus according to the present embodiment is characterized in that the condition of total reflection is satisfied so that a total reflection occurs in the reflection in the first plane (S1). Assuming n1 to be the refractive index of air, numeral n2 to be the refractive index of the prism (4), and numeral i to be the incident angle of the incident light (image light) onto the first plane (S1) (n2>n1), the condition of total reflection is expressed by the equation: $\sin(i)) > n1/n2$. The optical path of the reflected light from the display plane (5a) is separated from that of the illuminating light onto the display plane (5a) by the total reflection in the first plane (S1). This configuration improves both the usage efficiency of the illuminating light and the contrast further in comparison with the case of Embodiments 1 and 2.

The use of a reflective LCD (5) of the above-mentioned polarizer-plate-unnecessary type permits a much higher usage efficiency of the illuminating light. However, a reflective LCD of the type in which a two-dimensional image is displayed using two polarizer plates (P1, P2) in combination also may be used. In that case, as shown by the chain double-dashed lines in FIG. 3, a first polarizer plate (P1) is provided between the prism (4) and the condenser lens (3), while a second polarizer plate (P2) is provided between the prism (4) and the magnifier optical system (6). The second polarizer plate (P2) may be adhered onto the third plane (S3) similarly to Embodiment 1 (FIG. 1) and the like. In contrast, the configuration that the first polarizer plate (P1) is adhered onto the first plane (S1) may cause a difficulty in satisfying the condition of total reflection. Thus, the first polarizer plate (P1) is preferably arranged with a space from the first plane (S1).

In case of the use of a reflective LCD (5) of the polarizer-plate-unnecessary type, illuminating light emitted from the LED (1) passes through the diffuser plate (2) and the condenser lens (3), and is then incident on the first plane (S1) of the prism (4). Since the first plane (S1) is an ordinary glass surface, the most part of the illuminating light passes through the first plane (S1). The illuminating light having passed through the first plane (S1) passes through the second plane (S2), thereby illuminating the display plane (5a) of the LCD (5) substantially from the perpendicular direction. The LCD (5) controls the polarization of light selectively depending on the display at each pixel of a two-dimensional image (that is, the ON/OFF state of each pixel), thereby emitting the reflected light composed of two kinds of polarization (p-polarized light and s-polarized light) from the display plane (5a). The reflected light from the display plane (5a) passes through the second plane (S2), and is then totally reflected in the first plane (S1). The reflected light from the first plane (S1) passes through the third plane (S3) and exits from the prism (4). The light serving as the image light is incident on the magnifier optical system (6) and then introduced onto a screen or a viewer's eye (EP).

In an optical configuration in which the condition of total reflection is satisfied, a part of the illuminating light incident on the first plane (S1) is rejected, thereby resulting in a smaller exit pupil (EP) (a shape elongated in the direction perpendicular to the figure plane in FIG. 3) which is about half that of Embodiments 1 and 2. When the present embodiment is applied to an HMD, the magnifier optical system (6) serves as the ocular optical system for introducing the two-dimensional image displayed on the display plane (5a) onto a viewer's eye (EP) as a virtual image. Accordingly, a preferable optical configuration is such that the first plane (S1) is arranged in eccentric rotation around an axis substantially parallel to the alignment direction of the viewer's right and left eyes (EP). In such configuration, the exit pupil (EP) has a shape elongated in the horizontal direction with respect to the viewer, thereby providing an image image easy to watch. Further, the apparatus is applicable to various eye spacing depending on each viewer.

Figure 4:
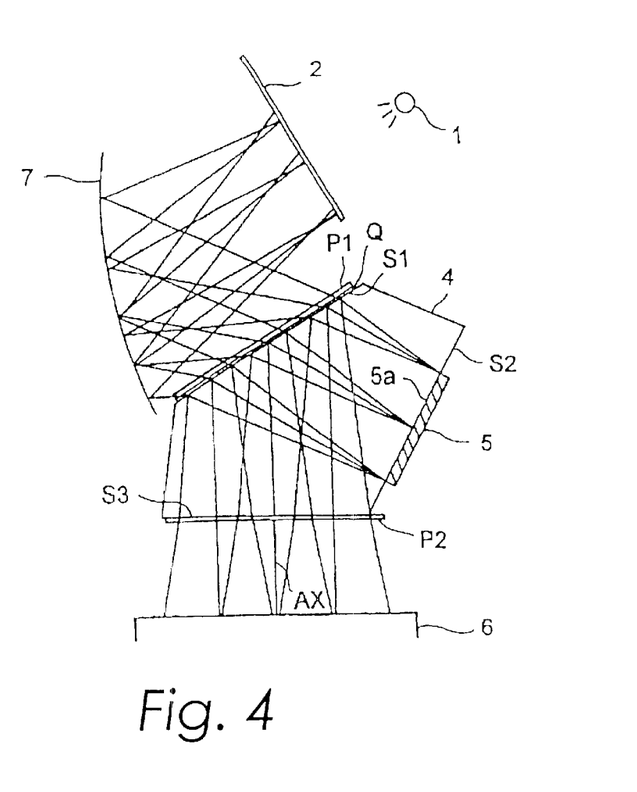
FIG. 4 is an optical configuration diagram showing a schematic configuration of Embodiment 4.

Embodiment 4 (FIG. 4)

FIG. 4 shows the optical configuration of Embodiment 4. An image display apparatus according to the present embodiment is characterized in that a concave reflection plane (7) is provided between the LED (1) or the like and the prism (4) and that the concave reflection plane (7) is used in place of the condenser lens (3) of FIG. 2. The other points are the same as the configuration of Embodiment 2. The concave reflection plane (7) is a reflection plane of a concave mirror composed of aluminum coating and the like. The function of a condenser lens is carried out by the concave reflection plane (7), whereby the image display apparatus can be miniaturized further in comparison with Embodiment 2 (FIG. 2).

Figure 5:
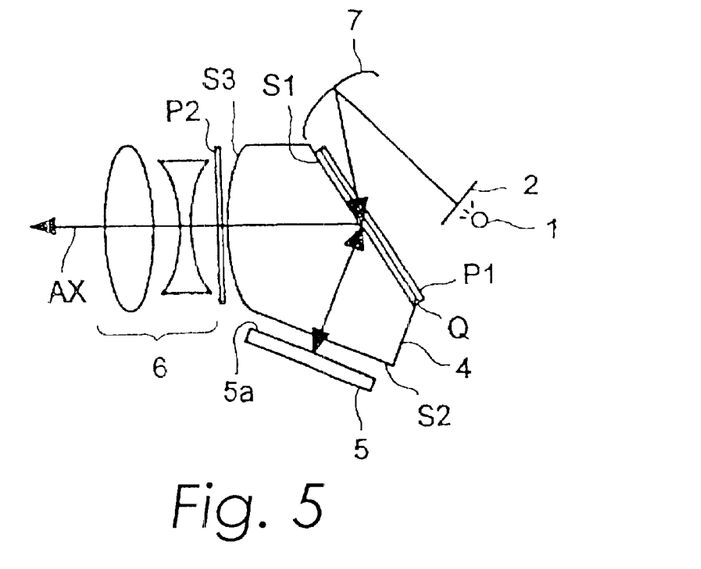
FIG. 5 is an optical configuration diagram showing a schematic configuration of Embodiment 5.
Figure 6:
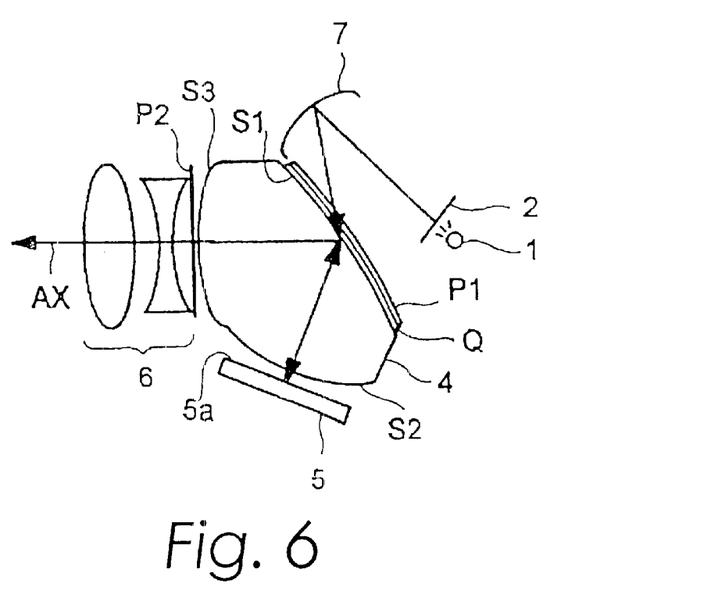
FIG. 6 is an optical configuration diagram showing a schematic configuration of Embodiment 6.

Embodiments 5 and 6 (FIGS. 5 and 6)

FIGS. 5 and 6 show the optical configuration of Embodiments 5 and 6, respectively. Image display apparatuses according to these embodiments are characterized in that at least one plane among the optical planes (S1–S3) has an optical power. The other points are the same as the configuration of Embodiment 4 (FIG. 4). In Embodiment 5 (FIG. 5), the third plane (S3) of the prism (4) has an optical power. In Embodiment 6 (FIG. 6), the first plane (S1), the second plane (S2), and the third plane (S3) of the prism (4) have an optical power.

In case that at least one plane among the optical planes (S1–S3) has an optical power, the usage efficiency of illuminating light is improved. In case that the last and third plane (S3) of the prism (4) has an optical power, the load of aberration correction by the magnifier optical system (6) is alleviated, whereby the magnifier optical system (6) can be miniaturized further. In case that the first to third planes (S1–S3) have an optical power, aberration correction can be carried out better by the magnifier optical system (6). In case that the second optical plane (S2) adjacent to the LCD (5) has an optical power, distortion in the observed two-dimensional image can be corrected better. Here, in a preferred embodiment, the first plane (S1) has substantially a flat curvature, while the LCD (5) display plane (5a) and the magnifier optical system (6) are in concentricity with each other.

Figure 7:
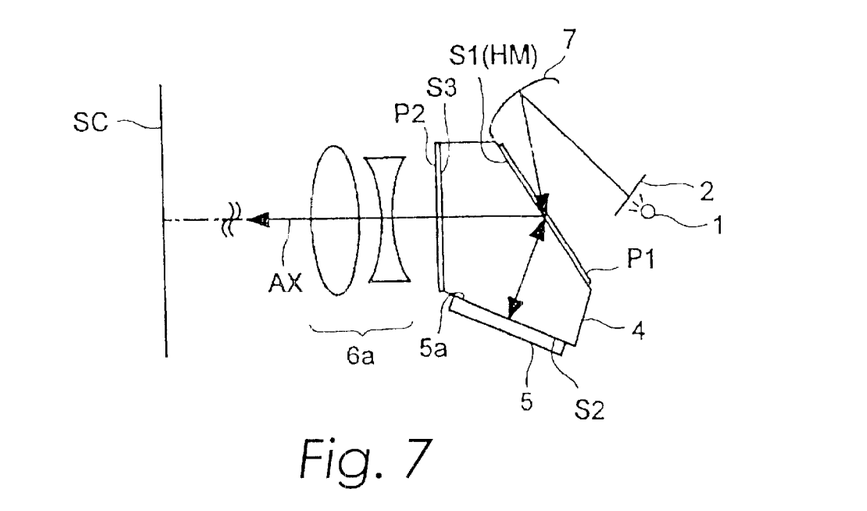
FIG. 7 is an optical configuration diagram showing a schematic configuration of Embodiment 7.

Embodiment 7 (FIG. 7)

FIG. 7 shows the optical configuration of Embodiment 7. An image display apparatus according to the present embodiment is a projector comprising: a screen (SC); and a projection optical system (6a) for magnifying and projecting a two-dimensional image displayed on the display plane (5a) of the LCD (5), onto the screen (SC). The basic configuration is similar to that of Embodiment 4 (FIG. 4). The projection optical system (6a) corresponds to the magnifier optical system (6). Further, a half-mirror plane (HM) is used similarly to Embodiment 1 (FIG. 1).

Figure 8:
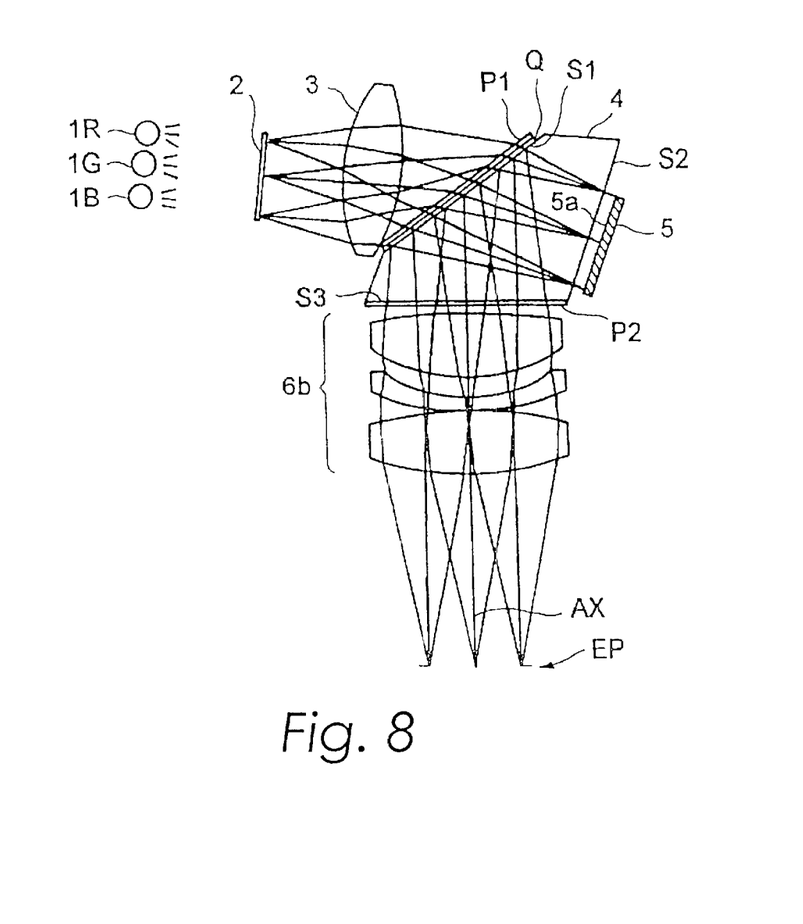
FIG. 8 is an optical configuration diagram showing a schematic configuration of Embodiment 8.

Embodiment 8 (FIG. 8)

FIG. 8 shows the optical configuration of Embodiment 8. An image display apparatus according to the present embodiment is a color HMD comprising an ocular optical system (6b) for introducing a two-dimensional image displayed on the display plane (5a) of the LCD (5) onto a viewer's eye (EP) as a virtual image. The basic configuration is similar to that of Embodiment 2 (FIG. 2). The ocular optical system (6b) corresponds to the magnifier optical system (6). For the purpose of color display, a light source is composed of three LED's (1R, 1G, 1B) for emitting light corresponding to three primary color components of R (red), G (green), and B (blue), respectively. The LCD (5) is driven by field sequential scheme, and the three LED's (1R, 1G, 1B) emits light sequentially in time sharing in synchronization with the image signal.

In the configuration of the present embodiment, the light source emits three primary color components of R, G, and B for displaying a full color image. However, two color components or four or more color components may be used for the color illuminating light depending on the displayed image. That is, it is sufficient to use at least two light emitting elements having light emission colors different from each other, however, it is preferable to use at least three light emitting elements capable of emitting three primary color components of R, G, and B. Here, application of the configuration in which three LED's (1R, 1G, 1B) are used for displaying a full color image is not restricted to the case of an HMD and is possible also to the case of a projector according to each embodiment.

As described above, each embodiment provides an image display apparatus of low cost, high image quality, light weight, and small size.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. An image display apparatus comprising:
    a reflective display element for displaying a two-dimensional image on a display plane;
    a light source for emitting illuminating light for illuminating said display plane;
    a magnifier optical system for magnifying and projecting said two-dimensional image; and
    an optical member which is composed of a medium having a refractive index greater than or equal to unity and has at least three optical planes of a first plane, a second plane, and a third plane;
    wherein the illuminating light from said light source passes through said first plane and then through said second plane, thereby illuminating said display plane, said illuminating light having an illumination propagation path prior to illuminating said display plane; and the reflected light from said display plane passes through said second plane and is then reflected in said first plane, thereby passing through said third plane and being incident on said magnifier optical system, said reflected light being directed to said magnifier optical system and having a reflected propagation path when reflected from said display plane that is substantially concentric with said illumination propagation path.

2. An image display apparatus according to claim 1, wherein at least one plane among said optical planes has an optical power.

3. An image display apparatus according to claim 1, wherein said first plane is a partially transmitting plane.

4. An image display apparatus according to claim 1, wherein said first plane is a polarization-selective reflection plane.

5. An image display apparatus according to claim 1, wherein the condition of total reflection is satisfied so that the reflection in said first plane is a total reflection.

6. An image display apparatus according to claim 5, wherein said magnifier optical system is an ocular optical system for introducing a two-dimensional image displayed on said display plane onto a viewer's eye as a virtual image, and wherein said first plane is arranged in eccentric rotation around an axis substantially parallel to the alignment direction of the viewer's right and left eyes.

7. An image display apparatus according to claim 1, wherein the space between said second plane and said display plane is in the close contact state, or alternatively filled with a medium having a refractive index greater than or equal to unity.

8. An image display apparatus according to claim 1, wherein a condenser lens is further provided between said light source and said optical member.

9. An image display apparatus according to claim 1, wherein a concave reflection plane is further provided between said light source and said optical member.

10. An image display apparatus according to claim 1, wherein said light source comprises at least three LED's for emitting light corresponding to three primary color components of R, G, and B, respectively.

11. An image display apparatus according to claim 1, further comprising a screen, wherein said magnifier optical system is a projection optical system for magnifying and projecting a two-dimensional image displayed on said display plane onto said screen.

12. An image display apparatus according to claim 1, wherein said magnifier optical system is an ocular optical system for introducing a two-dimensional image displayed on said display plane onto a viewer's eye as a virtual image.

* * * * *

UNITED STATES PATENT AND TRADEMARK OFFICE
CERTIFICATE OF CORRECTION

PATENT NO. : 6,683,726 B2
DATED : January 27, 2004
INVENTOR(S) : Takeshi Endo et al.

It is certified that error appears in the above-identified patent and that said Letters Patent is hereby corrected as shown below:

Column 1,
Lines 27 and 63, delete "viewers s", and insert -- viewer's --.
Line 62, delete the first occurrence of "image".

Column 4,
Line 23, delete "(Si)", and insert -- (S1) --.

Column 5,
Line 62, delete "sin(i))>n1/n/2", and insert -- sin(i)>n1/n/2 --.

Column 6,
Line 56, delete the first occurrence of "image".

Signed and Sealed this

Twentieth Day of July, 2004

JON W. DUDAS
*Acting Director of the United States Patent and Trademark Office*